United States Patent
Aarts et al.

(10) Patent No.: US 8,233,033 B2
(45) Date of Patent: Jul. 31, 2012

(54) SUPPLEMENTARY VISUAL DISPLAY SYSTEM

(75) Inventors: Ronaldus Maria Aarts, Geldrop (NL); Emmanuel Johannes Smits, Someren (NL)

(73) Assignee: TP Vision Holding B.V., Eindhoven (NL)

( * ) Notice: Subject to any disclaimer, the term of this patent is extended or adjusted under 35 U.S.C. 154(b) by 1138 days.

(21) Appl. No.: 10/596,452

(22) PCT Filed: Dec. 20, 2004

(86) PCT No.: PCT/IB2004/052865
§ 371 (c)(1),
(2), (4) Date: Aug. 20, 2008

(87) PCT Pub. No.: WO2005/062608
PCT Pub. Date: Jul. 7, 2005

(65) Prior Publication Data
US 2008/0297591 A1   Dec. 4, 2008

(30) Foreign Application Priority Data
Dec. 18, 2003 (EP) .................................... 03104779

(51) Int. Cl.
*H04N 13/04* (2006.01)
*G09G 5/00* (2006.01)
*G02F 1/1335* (2006.01)

(52) U.S. Cl. ................................ 348/51; 345/5; 349/61

(58) Field of Classification Search .................... 348/51, 348/739; 434/72; 715/788; 345/5; 349/61; H04N 13/04; G09G 5/00; G02F 1/1335
See application file for complete search history.

(56) References Cited

U.S. PATENT DOCUMENTS

| | | | |
|---|---|---|---|
| 5,515,069 A | 5/1996 | Dillon, III | |
| 5,807,110 A * | 9/1998 | Hytry et al. | 434/72 |
| 6,111,622 A * | 8/2000 | Abileah | 349/61 |
| 6,611,297 B1 | 8/2003 | Akashi et al. | |
| 6,717,596 B1 * | 4/2004 | Nason et al. | 715/788 |
| 2004/0239582 A1 * | 12/2004 | Seymour | 345/5 |

FOREIGN PATENT DOCUMENTS

| | | |
|---|---|---|
| DE | 2002420 U1 | 5/2000 |
| DE | 19902733 A1 | 7/2000 |
| WO | 0117240 A1 | 3/2001 |
| WO | 0232123 A2 | 4/2002 |
| WO | 03101098 A1 | 12/2003 |
| WO | 2004006578 A2 | 1/2004 |
| WO | 2004086824 A1 | 10/2004 |

* cited by examiner

*Primary Examiner* — Gims Philippe
(74) *Attorney, Agent, or Firm* — Shimokaji & Assoc., PC

(57) ABSTRACT

A visual display system includes a display device having an image display region for presenting images to a viewer. The system includes one or more illumination sources that at least partially peripherally surround the image display region and/or project illumination radiated therefrom so as to illuminate a region visually appearing to the viewer to at least partially peripherally surround the image display region. A control device controls light radiation emitted in use from the one or more illumination sources in response to at least one of image and audio indicative signals so as to provide at least a partial spatial extension of the image display region.

26 Claims, 6 Drawing Sheets

SUPPLEMENTARY VISUAL DISPLAY SYSTEM

The present invention relates to supplementary display systems suitable for including with or adding to display devices; in particular, but not exclusively, the present invention relates to a supplementary visual display system for use with audio/visual display devices such as television sets. Moreover, the invention also relates to methods of operating such supplementary visual display systems.

Visual display devices are well known and include cinematic film projectors, television sets, monitors, plasma displays, liquid crystal display (LCD) televisions, monitors and projectors to mention a few examples. Such devices are often employed to present images to viewers, the images being intended to be as lifelike as possible so as to absorb viewers' attention, thereby rendering the viewers momentarily less aware of their surroundings for concentrating on program content being presented on the devices. Moreover, the inventor has appreciated that the cost of pixel visual display screen size of such devices rises rapidly as screen size is increased; such increase of cost with size also pertains to projection type devices as projected image brightness decreases as image size increases unless relatively expensive high-brightness light sources are employed to maintain an acceptably bright presentation to the viewers. Thus, the inventor has appreciated that there is a practical economical limit to display device screen size.

Furthermore, the inventor has appreciated that a television apparatus, for example a high-definition wide-screen television, is often employed in domestic environments in which there is frequently sub-optimal lighting in a vicinity of where the apparatus is utilized. Such sub-optimal lighting is not only susceptible of giving rise to user viewing eyestrain over prolonged periods of image viewing using the apparatus, but also rendering a display area of the apparatus appear less realistic than necessary.

It is known to provide external lighting to television apparatus. For example, in PCT application no. WO 01/17240 (PCT/RU00/00202), there is described methods of improving perception of an electronic image and reducing tiredness due to prolonged viewing. The methods described concern external lighting using a rectangular or other shape frame disposed at a perimeter region around a television-type screen. Moreover, the frame comprises at least one source of visible light, namely the at least one source is operable to emit light blue and blue wavelength optical radiation. In operation, the brightness of a displayed image on the screen as well as the intensity of ambient lighting in a region proximate to the screen are measured and subsequently analyzed. Results of such analysis are used to control the brightness of the external lighting so that flaring of images on the screen is at least partially reduced. Control of the at least one source of visible light is achievable manually and/or automatically.

From the foregoing, it will be appreciated that it is known to add supplementary illumination around a visual display. However, the inventor has appreciated that such supplementary illumination is presently utilized sub-optimally for reducing eyestrain and providing a more aesthetically acceptable spatial interface between ambient illumination and an image display apparatus.

WO 03/10198 A1 discloses a method of providing aspects of an ambient environment, the method comprising receiving a video signal, processing the video signal and controlling ambient light accordingly.

WO 04/006578 A2 (which has been published after the priority date of the present application) discloses an on-line analysis of meta-data that is received together with video data, wherein the analysis results in an adaptation of lighting surrounding a presentation device.

WO 04/086824 A1 (which has been published after the priority date of the present application) discloses a system for creating a virtual three-dimensional illuminated scene.

WO 02/32123 A2 discloses a device cabinet with dynamically controlled appearance. Lights in the cabinet may flash to suggest the device is laughing in response to the detection of a laugh track in a sitcom being displayed on the device.

An object of the invention is to provide a supplementary visual display system for enhancing the appearance and user-acceptability of an image display apparatus, for example a wide-screen high-definition television.

According to a first aspect of the present invention; there is provided a supplementary visual display system for use in conjunction with a display device including an image display region for presenting images to a viewer, characterized in that the system comprises:
(a) one or more illumination sources disposed in a configuration at least one of:
(i) at least partially peripherally surrounding the image display region; and
(ii) arranged to project illumination radiated therefrom so as to illuminate a region visually appearing to the viewer to at least partially peripherally surround the image display region;
(b) monitoring means for monitoring at least one of:
(i) audio program content;
(ii) intensity and/or color and/or depth information in the entire image display region or in one or more sub-regions of the image display region when images are presented thereon,
and generating corresponding image and/or audio indicative signals; and
(c) controlling means for controlling light radiation emitted in use from the one or more illumination sources in response to the image and/or audio indicative signals so as to provide at least a partial spatial extension of the image display region.

The invention is of advantage in that it is capable of providing an enhanced visual and/or audio presentation in a 2D display device or in a 3D display device which is susceptible to reducing viewer eyestrain fatigue and/or enhancing viewing enjoyment. According to a preferred embodiment of the invention, an ambient lighting system is provided in which 3D information, that is to say depth information, of an image (for example from a video) is used to change or adjust the mapping of the light sources to the image data (for instance video data).

Preferably, in the system, the monitoring means and the controlling means are arranged such that the one or more illumination sources in conjunction with the monitoring means and controlling means are operable to respond to at least one of color and intensity and depth information presented in sub-regions of the image display region substantially spatially adjacent to where the one or more illumination sources are either mounted in respect of the image display region or arranged to project light radiation emitted therefrom as perceived by the viewer. By associating one or more illumination sources with associated sub-regions, it is feasible to extend the image display region effectively at modest cost.

Preferably, in the system, the one or more illumination sources in conjunction with the monitoring means and the controlling means are operable to at least partially mimic at least one of color and intensity and depth information in sub-regions of the image display region spatially adjacent to at least one of:
(i) where the one or more illumination sources are mounted in respect of the image display region; and (ii) where the one or more illumination sources are arranged to project their illumination as perceived by the viewer.

Such mimicking is of benefit in that the image display region is susceptible to being effectively spatially enlarged with satisfactory aesthetics.

Preferably, in the system, the controlling means is arranged to energize the one or more illumination sources in response to program content presented on the image display region in a temporally delayed manner. Such temporal delay is potentially of benefit in several respects; for example:

(a) when an abrupt change of program content on the image display region occurs causing a major change in overall light output from this region, for example where gangsters run from a sunny beach scene into a dark cave where counterfeit merchandise is stored, the one or more illumination sources change color and intensity more slowly allowing the eyes of the viewer to adjust gradually to the change in light output from the display region, thereby reducing eyestrain, especially in respect of viewer iris muscles;

(b) a more gradual change of the one or more sources of illumination renders them less noticeable to the viewer so that the viewer is not distracted in use from concentrating primarily on the image display region; and (c) a gradual change in illumination of the one or more sources of illumination is susceptible to increasing their operating lifetime when implemented using incandescent light sources whose lifetime is shortened by rapid thermal cycling.

More preferably, in the system, the temporally delayed manner of control has a temporal response associated therewith, the controlling means being arranged to render the temporal response dynamically variable as a function of program content presented on the image display region. Such intentional dynamic variability is of advantage to enhance presentation; for example, where a change of scene occurs as presented on the image display region, it is desirable that the one or more sources of illumination change relatively more rapidly than within a period during which a given scene is displayed on the image display region. The dynamic variability is thereby capable of providing a more acceptable aesthetic presentation to the viewer.

Preferably, in the system, the one or more illumination sources are disposed in one or more illumination panels disposed at least one of laterally, above and below the image display region when the display region is disposed in a substantially upright orientation. Such deployment is susceptible to being chosen depending upon, for example, a format of image presentation arising in operation on the image display region.

Preferably, the one or more illumination sources are arranged to emit their light radiation in a direction substantially away from the user so that the user will perceive the radiation as back-reflected radiation from a reflecting surface situated behind the display device.

Preferably, in the system, the one or more sources of illumination are susceptible to being selectively user-deactivated. Such an option enables the viewer to select a form of supplementary illumination which is aesthetically most suitable for the nature of program content being or to be presented on the image display region.

Preferably, in the system, the one or more panels are also arranged to include therein sound transducing means for generating sound to complement images presented on the image display region. In other words, for example, the one or more panels are susceptible to including sound generating transducers such as one or more planar loudspeakers for generating sound to accompany program content presented on the image display region. Such synergistic collocation is especially appropriate when multi-phonic, for example stereophonic, sound reproduction is desired using panels disposed laterally in use relatively to the image display region.

Preferably, in the system, at least one of the one or more panels includes a plurality of groups of sources of illumination with light diffusing means spatially interposed therebetween for causing in use a more gradual color and/or intensity and/or depth information transition between the groups of sources. Use of the light diffusing means is of benefit in that it enables relatively few sources of relatively high-output illumination to be employed in comparison to utilizing a multiplicity of relatively lower-output illumination sources without associated light diffusing means; a multiplicity of relatively lower-output sources substantially devoid of light diffusing means is potentially a more costly implementation.

Preferably, in the system, the one or more sources of illumination are susceptible to being added to the display device as one or more retrofit components. Such a manner of deployment is susceptible to rendering the system more widely useable with older types of visual display devices. More preferably, in the system, the display device is a television set. Yet more preferably, the display device is a wide-screen television set with the one or more panels disposed laterally in respect of the image display region. Alternatively, the one or more panels can be disposed to project their light radiation away from the viewer so that the viewer perceives the radiation as back-reflected radiation from a surface situated behind the display device.

Preferably, in the system, at least one of the one or more panels are pivotally and/or foldably mounted to the display device so that the at least one of the one or more panels can be hidden from view when not required to enhance the image display region. Such an arrangement is of advantage when shipping the system in transportation packaging around the World because packaging can thereby be more compact. Moreover, such mounting is also susceptible to addressing viewers' personal aesthetic preferences.

Preferably, in the system, the monitoring means and the controlling means are arranged to energize the one or more sources of illumination in response to ambient conditions pertaining to the display device as well as in response to program content presented on the image display region. Operating the one or more illumination sources in response to ambient conditions is susceptible to reducing viewer eyestrain, prolonging operating lifetime of the one or more sources of illumination and addressing viewers' aesthetic preferences. More preferably, in the system, the monitoring means and the controlling means are arranged to energize the one or more sources of illumination such that those sources spatially adjacent to the image display region are arranged to provide at least a partial extension of program content presented on the image display region: and those sources spatially more remote from the image display region to blend in with the ambient conditions.

In the following, embodiments of the invention will be described which include the feature that depth information of image data is monitored and used by the controlling means to control the illumination sources. Such depth information can be derived from and used in the frame of a 2D display device capable of displaying non-steric images and also a 3D display device capable of displaying steric images The term "depth information" denotes information contained or encoded in image data to be displayed on the a display device, which depth information concerns the position of objects of an image in a direction perpendicular to an (essentially two-dimensional) image screen. For instance, a video may show a car driving in a direction which does not lie in the plane of the display screen (that is which approaches a viewer or which departs from a viewer). Such a car has, at each instance of time, a particular depth with respect to the image screen. The more the car approaches, the smaller becomes this distance. The more the car departs, the larger becomes this distance. According to the invention, such depth information can be determined and may be used to control light radiation emitted from the illumination sources. Coming back to the example of the approaching car: the further the car departs, the farther away may the location of the light sources being currently illuminated, and vice versa.

An embodiment taking into account depth information as defined above is directed to a supplementary visual display system for use in conjunction with a display device including an image display region for presenting images to a viewer. This system comprises one or more illumination sources which at least partially peripherally surround the image display region and/or project illumination radiated therefrom so as to illuminate a region visually appearing to the viewer to at least partially peripherally surround the image display region. The system further may comprise analyzing means for analyzing depth information of the video program content presented and generating corresponding image depth indicative signals. Controlling means may be provided for controlling light radiation emitted in use from the one or more illumination sources in response to at least one of the depth indicative signals so as to provide at least a partial spatial extension of the image display region.

Such depth information may change the direction of light emitted by the illumination source(s) and/or may define which of a plurality of illumination sources are currently activated and/or may define a sequence according to which different illumination sources are activated to mimic a dynamic effect. Thus, ambient lighting mapping video content to color and/or intensity of light emitted by illumination sources is further extended from having a pure two-dimensional character to a (at least partial) three-dimensional character. Thus, particularly ambient lightning of TVs is enhanced.

Depth information can be derived from 2D image data (for instance video data) in a conventional manner. Thus, in case that 2D image data are provided, depth information can be determined/calculated from these 2D image data.

However, in an alternative case, 3D image data are provided. This scenario is related to a case in which the supplementary visual display device according to the invention is realized as a 3D display device (for instance a 3D monitor or a 3D TV or a 3D computer game device). In such a case, the three-dimensional effect perceivable by a user can be achieved by providing additional information related to the third dimension, which is required additionally in the case of stereoscopic 3D display device compared to a 2D device.

In the frame of this application, a "3D display device" (three-dimensional display device) denotes any type of display device which provides a viewer with some kind of steric impression when watching image content displayed by the display device.

Particularly, the term "3D display device" denotes any kind of device which provides more spatial information or a more steric impression than a common 2D device (two-dimensional display device), or gives any kind of "depth-like" effect.

In the following, examples will be explained how such a 3D impression may be achieved.

Television, video and motion pictures may consist of a continuous stream of still frame pictures. Each frame may be presented so fast that a viewer cannot notice any change. If there is any motion in the scene such as a wild car chase or similar action or movement, there will be a perceptible difference between adjacent frames. If the movement in the frame just happens to be equal to the spacing of human eyes, and in the correct direction, a viewer will see a true stereoscopic view of the scene.

According to one approach to achieve a 3D effect, a shot with a special camera rig comprised of two cameras, producing a "left eye view" and a "right eye view" may be performed. The two resulting video tapes are edited and then encoded. The result is a single video tape, in 3D, ready for broadcast. An anaglyph is a single image composed of two (left and right eye) images being color coded, for example one cyan (blue/green), one red, and superimposed. When viewed through glasses having the proper colored lenses (that is for instance cyan/red), a viewer can see a fully three-dimensional (stereoscopic) image.

When 3D image data is available, then the depth information may be given by the signal itself. Thus, if true 3D data are available, for instance given by two cameras, depth info can be calculated. Also, if 2D image data plus meta data is transmitted (to restore 3D video), then depth information can be derived from such data. The calculation of the 3D ambient light may be done at the transmission site or at the receiving site. Meta data may be used as a source of meta data. Such meta data may be sent together with the video stream, but may also be received by other means (for instance from the internet or from a database which may be included in the device).

Thus, depth maps may be extracted on the basis of two-dimensional image data or on the basis of three-dimensional image data.

Taking into account depth information, that is to say image information related to a direction perpendicular to a planar image display region, allows to extend ambient lighting from two dimensions to three dimensions. Two-dimensional ambient lighting maps video content to color and intensity of light emitted by light sources, whereas three-dimensional ambient lighting uses depth information of the image data (for instance video data) to control particularly a direction along which an illumination source emits light. Such a direction can be changed by addressing a different bar or array of light sources. Alternatively, other means (like a mirror or a support substrate on which the illumination source(s) is or are attached) can be used to change direction or position, for instance by pivoting or shifting.

An idea related to the described embodiment of the invention is to enhance ambient lighting by exploiting the depth information available in a 3D TV and use this information as an extra input for ambient lighting. Thus, depth information is used to change the mapping of the video to the light source(s). Particularly, only the direction of the light may be changed by using depth information.

According to an embodiment of the invention having implemented the use of depth information, determined depth information is transmitted to an electrical rotatable mirror, wherein the mirror rotates the light beam(s) emitted by the illumination source(s) such that the place, position or location where the light will be projected depends on the depth of the video image.

According to an alternative embodiment of the invention having implemented the use of depth information, in order to avoid movable parts, multiple illumination sources may be used. From these multiple illumination sources, only a part may be urged to emit light at a particular instant of time. By subsequently activating single or groups of the multiple illumination sources, depth information can be reflected in the manner of lighting the different illumination sources. A corresponding selection of a particular one or of a particular group of the multiple illumination sources, that is to say an array selection, can be performed by the output of the depth information unit.

According to the invention, a mapping of a three-dimensional video component to light may be carried out. Particularly, a place to which the light is projected or the brightness of the light may be adjusted to correspond to depth information. For this purpose, the illumination sources may be rotated mechanically. The angle of rotation may be determined by the three-dimensional part of the content. However, instead of mechanically rotating the devices, bars of light-emitting diodes (LED-bars) may be used which are activated/deactivated in accordance to a scheme which depends on the depth information. In other words, the 3D content selects which LED-bar(s) is or are activated at a time, and this or these LED-bars is or are arranged such that the place where the light is projected, depends on the 3D content. More generally, ambient lighting may be controlled by depth information. Thus, the 3D part of the video content controls light to be directed along one way or along an opposite way. By taking this measure, a viewer may feel more emerged.

The data to be displayed on the display device may be received from a storage means inserted in a receiving unit of the supplementary visual display device (for instance stored on a video cassette or a DVD or a CD), may be received via a TV transmission channel or may be downloaded or transmitted via a network (for instance the internet).

In the following, preferred embodiments of the system according to the invention will be described which relate to an implementation in which depth information is used.

According to one embodiment, the display device may be adapted as a display device capable of displaying two-dimensional images. For example, the display device may be a cathode ray tube, a liquid crystal display or a plasma display device. The display device may be implemented as a television device, as a monitor, or as a computer game device.

Referring to this embodiment, the monitoring means may be adapted to determine the depth information from two-dimensional image data related to two-dimensional images to be presented on the display device. In other words, the two-dimensional image data with which the display device is supplied is used as a source for extracting the depth information. Thus, even a sequence of two-dimensional images may be used to derive depth information. For instance, a video may show an approaching car. From the (changing) dimensions and/or from the shape of the car it may be derived information concerning velocity or actual position of the car in the image. Analyzing a sequence of pictures may therefore be performed to determine depth information.

According to an alternative embodiment, the display device may be adapted as a display device capable of displaying three-dimensional images. As described above, it is possible to display stereoscopic images on a planar display device.

Still referring to this embodiment, the monitoring means may be adapted to determine the depth information from three-dimensional image data related to three-dimensional images to be presented on the display device. In this case; the data encoding three-dimensional images to be displayed contain information about the third dimension being perpendicular to the planar display device, which data either directly include depth information or allow to derive depth information.

Particular, the visual display system according to the described embodiment may be configured such that the monitoring means is adapted to determine the depth information from meta data forming a part of three-dimensional image data related to three-dimensional images to be presented on the display device. For instance, 3D image data may be divided into 2D image data and additional meta data. A combination of these data allows to restore the three-dimensional image. In the frame of the described embodiment, the required depth information is derivable from such meta data.

The monitoring means may be adapted to generate image indicative signals (or more specifically: depth indicative signals) corresponding to the depth information in such a manner that a location at which the one or more illumination sources emit light radiation is correlated with a location of at least one object displayed on the image display region. An object (for instance a car or a person) may be shown on the display device to be located in front of a background (for instance a wall). The distance between a camera capturing the image and the object/the background is depth information. The manner how the illumination sources are activated/deactivated corresponds or correlates to the geometrical distances of object/background with respect to a camera plane. Particularly, the position at which an illumination source is currently located is controlled to correlate with such depth information. To maintain this correlation during replay of a video, the positions of the illumination sources can be updated to retrace the motion of objects in the image. This can be achieved by moving the illumination sources or by mimicking a dynamics by selectively swiching on or off particular illumination devices.

Alternatively or additionally, the monitoring means may be adapted to generate image indicative signals (or more specifically: depth indicative signals) corresponding to the depth information in such a manner that color and/or brightness and/or intensity of light radiation emitted by the one or more illumination sources is correlated with a location of at least one object displayed on the image display region. Coming back to the above example, the fact that the car (as an example for the object) moves during a video excerpt such that the depth properties are modified may have the consequence that the light properties are tracked to this modification. When the car departs, the intensity of the corresponding light may be reduced, the colors may become darker, the brightness may decrease. Thus, a modification of the depth information may yield a modified light emission property of the illumination devices.

The one or more illumination sources of the visual display system may be provided in a movable manner, and the monitoring means may be adapted to generate image indicative signals (or more specifically: depth indicative signals) corresponding to the depth information in such a manner that the one or more illumination sources emitting light radiation is or are moved in correlation with a location of at least one object displayed on the image display region. According to this embodiment, the illumination sources are moved to be translated and/or rotated to reflect a particular depth information or change of depth information in the displayed image.

The visual display system according to the invention may comprise a plurality of illumination sources which are provided in an immovable manner, and the monitoring means may be adapted to generate image indicative signals (or more specifically: depth indicative signals) corresponding to the depth information in such a manner that the plurality of illumination sources are forced to subsequently emit light radiation in a predetermined order to thereby mimic a motion in correlation with a location of at least one object displayed on the image display region. Therefore, in order to avoid movable parts, multiple illumination sources may be used, wherein only a part of these illumination sources is controlled to emit light at each moment. In correspondence with depth information, different illumination sources can be activated or deactivated, one-by-one or groupwise. The activation/deactivation of the illumination sources can be controlled based on depth information.

The plurality of illumination sources may be provided as a matrix-like array having rows and columns. Thus, a plurality of bars of illumination may be provided, wherein each bar may be brought to illumination individually.

The visual display system may be configured such that the one or more illumination sources is or are provided on a carrier substrate. For instance, the illumination sources may be attached on the surface of a disk or plate made of an opaque, transparent or reflecting material. For moving the illumination sources, only the substrate has to be moved, not each illumination source individually.

The carrier substrate can be attached to the display device in a pivotable manner. For instance, a hinge joint may connect the display device with the carrier substrate so that the illumination sources are rotatably connected to the display device.

It shall be emphasized that each and every embodiment and aspect disclosed herein, particularly those related to ambient lighting, may be implemented in the frame of the display of two-dimensional images (that is to say with a conventional television set) or in the frame of the display of three-dimensional images (that is to say with a 3D television set).

According to a second aspect of the present invention, there is provided a method of operating a supplementary visual display system for use in conjunction with a display device including an image display region for presenting images to a viewer, characterized in that the method includes the steps of:
(a) disposing one or more illumination sources in a configuration including at least one of:
(i) at least partially peripherally surrounding the image display region; and
(ii) arranged to project illumination radiated therefrom so as to illuminate a region visually appearing to the viewer to at least partially peripherally surround the image display region;
(b) monitoring using monitoring means at least one of
(i) audio program content, and
(ii) intensity and/or color and/or depth information in the entire image display region or in one or more sub-regions of the image display region when images are presented thereon and generating corresponding image and/or audio indicative signals; and
(c) using controlling means for controlling light radiation emitted in use from the one or more illumination sources in response to the image and/or audio indicative signals so as to provide at least a partial spatial extension of the image display region.

It will be appreciated that features of the invention are capable of being combined in any combination without departing from the scope of the invention.

The above-mentioned method of operating a supplementary visual display system for use in conjunction with a display device including an image display region for presenting images to a viewer (particularly the method steps of "monitoring" and of "controlling") can be realized by a computer program, that is by software, or by using one or more special electronic optimization circuits, that is to say in hardware, or in hybrid form, i.e. by means of software components and hardware components.

Embodiments of the invention will now be described, by way of example only, with reference to the following diagrams, wherein:

FIG. 1 is a schematic diagram of a supplementary visual display system comprising an image display peripherally surrounded by a supplementary visual display;

FIG. 2. is another schematic diagram of the system of FIG. 1 wherein the image display is only partially surrounded at lateral sides thereof by the supplementary visual display;

FIG. 3 is a detailed illustration of a functional implementation of the system of FIG. 2;

FIG. 4. is an illustration of the supplementary visual display system in a preferred form wherein its supplementary display is arranged to utilize back-reflection from a rear surface; and FIG. 5 is a control circuit suitable for use with the functional implementation of the system as depicted in FIGS. 2 and 3;

Figure 1:
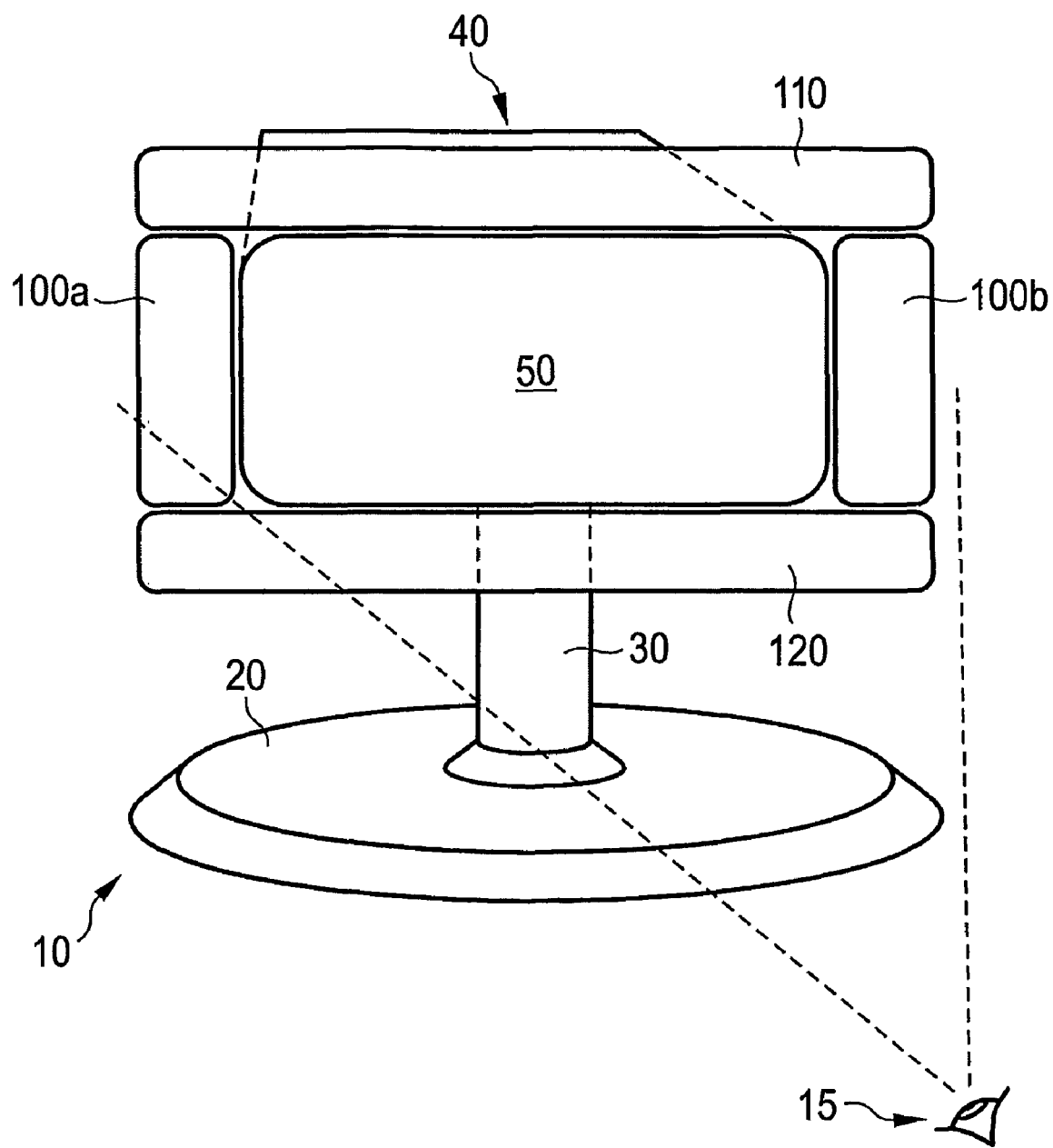

The inventor has appreciated that it is possible to enhance image display devices by adding thereto supplementary visual display systems to enhance realism of images presented on the devices, namely enhancing viewing experience, as well as to reduce eyestrain after prolonged viewing of images presented on the device. Eyestrain when viewing display devices, for example television sets, is especially exacerbated when such devices are placed in poorly-illuminated rooms where the display device appears relatively bright in comparison to surrounding regions, for example surrounding walls, ceiling and floor. Moreover, such eye fatigue arises as a consequence of fluctuating light emission from the display devices causing the human eye to vary its iris aperture frequently resulting in repetitive eye muscle strain. However, many viewers prefer to view display devices such as television sets in subdued lighting because the viewers are then less aware of ambient surroundings when viewing program material on the display devices, thereby enhancing realism of program material presented.

The inventor has not only appreciated that eyestrain is potentially a significant problem after prolonged viewing but also that the human eye provides most resolution in a central part of its field of view and poorer resolution off-centre. In consequence, when a viewer looks at a central part of a display device whereat an image is presented, peripheral regions of the display device are perceived in a blurred indistinct manner. In consequence, the inventor has envisaged that viewers are not aware of fine visual detail present in such peripheral regions but only the general form including color texture of such regions.

Thus, the inventor has appreciated that it is highly desirable to include at least one of:
(a) a supplementary visual display system at a peripheral region of a display device to provide effectively a spatial visual extension of the device; and
(b) a supplementary visual display system arranged to project light radiation which is observable to a viewer of the device as illumination at a peripheral region of a display device providing a spatial visual extension of the device.

Preferably, the display system can be disposed substantially behind the image display region and arranged to project light radiation towards a surface disposed behind the display region operable, in use, to provide a viewer of the display region with supplementary illumination at least partially surrounding the display region. Alternatively, or additionally, the display system at least partially surrounds an image display region of a display device. Preferably, especially in view of contemporary wide-screen television format, the supplementary visual display system is included at lateral regions to the display region.

In operation, the supplementary display system is implemented as an extension of the display region, continuing spatially further color and image intensity characteristics of the image presented in the display region. Moreover, the supplementary display system is preferably arranged to follow temporal dynamics of image color and intensity, especially at edges of the display region. In order to reduce eyestrain, the supplementary display system is susceptible to being implemented so that its temporal response is somewhat slower than the rate of change of images on the display region of the display device. More preferably, the supplementary display system is arranged to respond more rapidly when a major change in display region visual content occurs, for example a complete change of scene.

The supplementary display system is preferably implemented using light emitting diode (LED) technology or equivalent lighting technology. As used herein, the term "LED" is to be construed broadly to mean any light emitting system that is capable of receiving an electrical signal and producing a color of light in response to the signal. Hence, the term "LED" should be construed to include light emitting diodes of all types, light emitting polymers, semiconductor dies that produce light in response to current, organic LEDs, electro-luminescent strips, silicon-based structures that emit light, and other such systems. In an embodiment of the present invention, a "LED" may refer to a single light emitting diode package having multiple semiconductor dies that are individually controlled.

A LED system is one type of illumination source. As used herein, "illumination source" is to be construed to include all illumination sources, for example to include LED systems, as well as incandescent sources such as filament lamps, photoluminescent sources including gaseous discharges, fluorescent sources, phosphorescence sources, lasers, electroluminescent sources such as luminescent lamps, cathode luminescent sources using electronic satiation, luminescent sources including galvano-luminescent sources, crystallo-luminescent sources, kine-luminescent sources, thermo-luminescent sources, triboluminescent sources, sonoluminescent sources and radioluminescent sources.

Embodiments of the present invention will now be elucidated with reference to the accompanying FIGS. 1 to 7.

Referring to FIG. 1, there is shown a display device comprising a supplementary visual display system according to the invention, the device and its supplementary system being indicated generally by 10. In operation, the device and its supplementary system 10 are susceptible to being viewed by a viewer indicated by 15. The device includes a base plinth 20 for placing upon a floor or on a table in a room accommodating the device and its system 10. A columnar support 30 is coupled at its first elongate end to a central upper region of the plinth 20 and at its second elongate end to a central underside or rear region of a monitor 40 including an image display region 50 susceptible to being viewed by the viewer 15. The monitor 40 is one or more of a convention cathode ray tube (CRT) display, a liquid crystal display (LCD), a plasma discharge display, a projection display, thin-film printed optically-active polymer display or a display using functionally equivalent display technology. As an alternative to employing the plinth 20 and its associated columnar support 30, it is envisaged that the monitor 40 is capable of being mounted directly on a wall, in a manner of a wall-mounted display.

At a peripheral region of the display region 50, there is provided the supplementary illumination system implemented as left and right lateral illumination panels 100a, 100b respectively together with an upper illumination panel 110 and a lower illumination panel 120. Optionally, the panels 100a, 100b, 110, 120 are susceptible to being implemented as an integral part of the monitor 40, for example included during manufacture of the monitor 40. Alternatively, the panels 100a, 100b, 110, 120 are susceptible to being implemented as retrofit components to existing monitors, for example to the monitor 40, for enhancing its operation.

Figure 4:
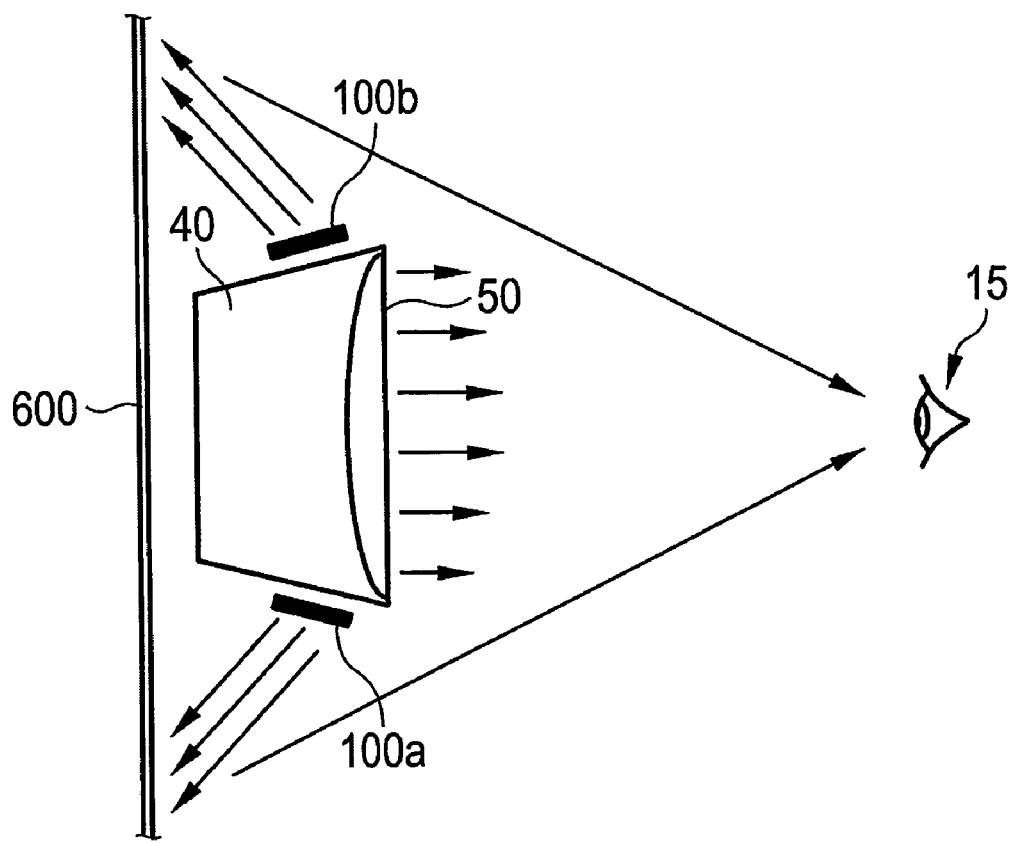
Figure 4:
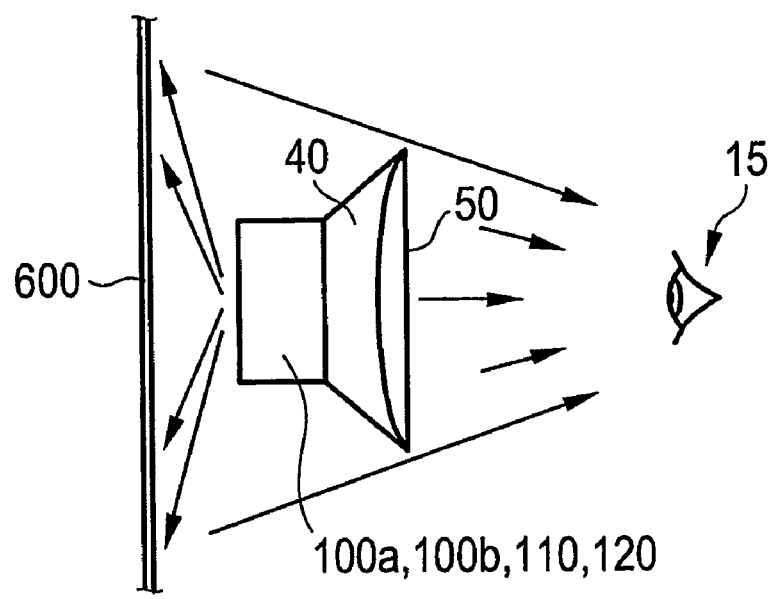

In a preferred embodiment of the invention, the supplementary illumination system is susceptible to being implemented as one or more units mounted at a rear region of the monitor 40 and arranged to project illumination one or more of laterally, upwardly, downwardly and backwardly relative to the display region 50 and the viewer 15. Preferably, the supplementary system is operable to illuminate a surface behind the monitor 40 as illustrated in FIG. 4, for example a white wall 600, so that the viewer 15 perceives when viewing the display region 50 there to be supplementary illumination at a peripheral region of the display region 50, for example in a manner of a surrounding light halo. In such an arrangement, one or more of the illumination panels 100a, 100b, 110, 120 are susceptible to being mounted as a cluster at a rear region of the monitor 40 as shown in FIG. 4. If desired, detachable white reflecting panels can be provided as an additional feature of the monitor 40 when it is employed in environments where the white wall 600 is not available as a back-drop. Rear mounting of one or more of the panels 100a, 100b, 110, 120 in a cluster is of benefit in that the monitor 40 with its associated supplementary illumination system can be rendered more compact, namely substantially similar in size to the monitor 40 itself.

Figure 2:
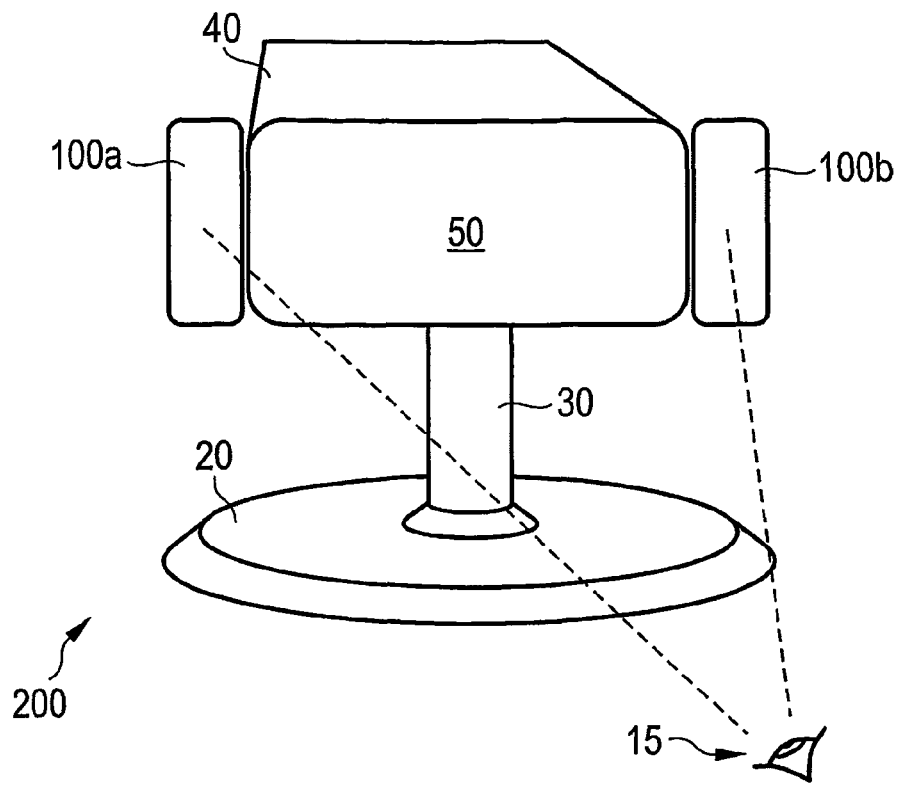

Optionally, one or more of the upper and lower illumination panels 110, 120 can be omitted as illustrated in FIG. 2 wherein there is shown the display device including the two lateral panels 100a, 100b indicated generally by 200, for example to provide a laterally wide format in a style akin to contemporary high-definition wide-screen format television apparatus; similar considerations pertain when backwardly projected light radiation is employed. Moreover, optionally, left and right stereo loudspeakers for generating audio output corresponding to an image presented on the display region 50 are included integrally or collocated with the lateral panels 100a, 100b for purposes of spatial compactness and/or manufacturing cost reduction.

In operation, the monitor 40 displays program content on the display region 50 for viewing by one or more viewers. The panels 100a, 100b, 110, 120 include sources of illumination which mimic image color and intensity of edge regions of the display region 50 to which they substantially abut. For example, the upper panel 110 is arranged to mimic in color and intensity an upper region of the display region 50 more remote from the columnar support 30. The panels 100a, 100b, 110, 120 thereby are operable to provide a graduated spatial display interface from the display region 50 to ambient surrounding regions, thereby improving perceived image realism presented by the monitor 40 and also assisting to reduce viewer eyestrain.

The panels 100a, 100b, 110, 120 include illumination sources as described in the foregoing. Preferably, the illumination sources are implemented as light emitting diodes (LEDs) although other implementations are also feasible as elucidated in the foregoing. The illumination sources are susceptible to being disposed so that they radiate their light radiation directly towards the user and/or, most preferably, rely on the light radiation being reflected from an at least partially reflecting surface positioned behind the monitor 40, for example the substantially white wall 600 in front of which the monitor 40 is placed in use as illustrated in FIG. 4. Associated with the panels 100a, 100b, 110, 120 and their illumination sources are electronic drive circuits and suitable interfaces. Signals for input to such electronic drive circuits are derived from optical sensors and/or from program data employed to generate images on the display region 50 of the monitor 40. When optical sensors are employed, they are preferably directed towards monitoring color and intensity of associated parts of the display region 50 and/or ambient conditions in the room in which the display devices and supplementary systems 10, 200 are operated.

Figure 3:
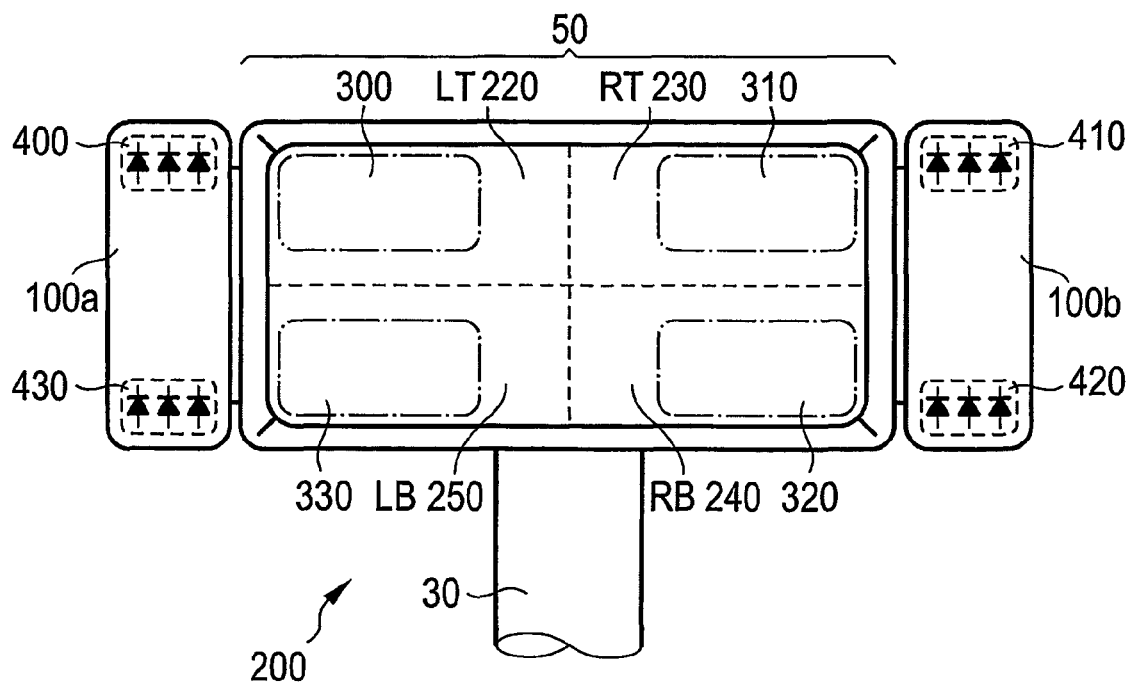

The display device and system 200 may be implemented as illustrated in FIG. 3, although a back-reflecting configuration as illustrated in FIG. 4 is more preferred. The display region 50 is, for purposes of providing signals to drive the lateral panels 100a, 100b, subdivided into four quadrants, namely a left top quadrant (LT) 220, a right top quadrant (RT) 230, a right bottom quadrant (RB) 240 and a left bottom quadrant (LB) 250. Within each of the quadrants 220, 230, 240, 250 there are corresponding monitoring regions 300, 310, 320, 330 respectively. The regions 300, 310, 320, 330 are preferably smaller in area than their corresponding quadrants 220, 230, 240, 250 as illustrated; for example, each monitoring region 300, 310, 320, 330 is preferably in a range of 50% to 90% of its corresponding quadrant 220, 230, 240, 250 respectively. Moreover, the monitoring regions 300, 310, 320, 330 are preferably arranged to include substantially extreme corners of the display region 50 as shown.

Alternatively, in order to obtain a more averaged effect, the monitoring regions 300, 310, 320, 330 can be arranged to be somewhat larger than their corresponding quadrants 220, 230, 240, 250.

Although four monitoring regions 300, 310, 320, 330 are described, it will be appreciated that other numbers of monitoring regions are susceptible to being employed. For example, two lateral monitoring regions only can be optionally employed. Alternatively, upper and lower monitoring regions only can also optionally be employed. Yet alternatively, two lateral monitoring regions and an upper monitoring region can be optionally employed, namely three monitoring regions.

In operation, electronic drive circuits associated with the lateral panels 100a, 100b are operable to monitor image brightness in their associated monitoring regions 220, 230, 240, 250. Namely, the electronic drive circuits associated with the left lateral panel 100a are arranged to monitor image brightness and color in the monitoring regions 300, 330. Similarly, the electronic drive circuits associated with the right lateral panel 100b are arranged to monitor image brightness and color in the monitoring regions 310, 320.

The lateral panels 100a, 100b will now be described in further detail. The panels 100a, 100b are similar in construction except that the left panel 100a is arranged to be mounted or coupled to a left-hand side of the monitor 40 whereas the right panel 100b is arranged to be mounted to a right-hand side of the monitor 40. Each of the panels 100a, 100b is elongate in form and includes two groups of illumination sources. For example, the left lateral panel 100a includes a first upper group of illumination sources 400 and a second lower group of illumination sources 430. Similarly, for example, the right lateral panel 100b includes a first upper group of illumination sources 410 and a second lower group of illumination sources 420. More preferably, light emitting diodes, namely LEDs as construed in the foregoing, are employed as illumination sources in the panels 100a, 100b. The lateral panels 100a, 100b preferably also each include optical diffusers and/or light guides for spreading light emitted from the upper and lower groups of illumination sources of the lateral panels 100a, 100b so as to present to the viewer a spatially gradually changing brightness and color from the lower group to the upper group. As an alternative to using optical diffusers, the lateral panels 100a, 100b can be provided with a graduated array of illumination sources arranged to provided a graded spatial change in color in operation between elongate ends of the lateral panels 100a, 100b. Similar considerations apply when back-reflecting operation is employed as illustrated in FIG. 4 corresponding to a preferred arrangement for the present invention.

For example, an image presented on the display region 50 corresponds to a sandy yellow beach with blue sky bathed in bright sunshine. In consequence, the monitoring regions 320, 330 include relatively bright yellow pixels whereas the monitoring regions 300, 310 include moderately bright blue pixels on average. The electronic drive circuits coupled to the groups of illumination sources of the panels 100a, 100b are responsive to color and brightness information present in the monitoring regions 300, 310, 320, 330 to cause the upper group of illumination sources 400, 410 to emit moderately-bright blue light radiation to provide effectively an extension of sky image details presented on the display region 50, and the lower group of illumination sources 420, 430 to emit bright yellow light radiation to provide effectively an extension of yellow beach details presented on the display region 50.

Thus, the groups of illuminations sources 400, 410, 420, 430 are operable when energized by the drive circuits to generate light radiation of any color and brightness corresponding approximately to that of the display region 50. If required, for example for producing special effects to complement image detail such as bomb explosions and thunder lightning strikes, for example in a horror movie or discotheque scene, the lateral panels 100a, 100b can also be arranged to include discharge tubes, for example xenon discharge tubes, for producing bright flashes of light for special aesthetic effects.

It will be appreciated that, additionally or alternatively, one or more of the panels 100a, 100b, 110, 120 are susceptible to being implemented as one or more units mounted substantially behind the monitor 40 or at side regions of the monitor 40, the units arranged to project their illumination away from the viewer 15 towards a surface located substantially behind the monitor 40 for providing supplementary visual detail to provide an effective spatial visual extension of the display region 50. Such arrangements are illustrated in FIG. 4 and correspond to preferred embodiments of the invention.

In order to enable the lateral panels to blend better into ambient room surroundings, the lateral panels 100a, 100b energized by their associated drive control circuits can be arranged to cause extreme lateral edges of the panels 100a, 100b remote from a central part of the display region 50 to track room illumination and wall color immediately behind the monitor 40 and seen as background by the viewer. In consequence, the display devices and their supplementary illumination systems 10, 200 can be arranged to provide a spatially gradual transition from the display region 50 to ambient surroundings in the field of view of the viewer. Such monitoring of ambient lighting and color conditions present in the room is implemented by at least one of manual user control and sensors of the systems 10, 200 arranged to monitor surrounding ambient conditions. Such sensors for this purposes are conveniently mounted on rear-facing surfaces of the lateral panels 100a, 100b.

The aforementioned drive circuits connected to the lateral panels 100a, 100b can be arranged so that light radiation emitted from the panels 100a, 100b is at least partially modulated by audio content being provided from loudspeakers of the monitor 40 to the viewer. In this respect the display devices and their associated supplementary illumination systems 10, 200 are susceptible to being operated in a discotéque mode to provide special effects. Sound information can either be derived from microphone transducers included in the lateral panels 100a, 100b, for example where the panels are intended as retrofit components to existing monitors or television sets, or coupled to a sound output connection of the monitor 40, for example an auxiliary audio output of the monitor 40.

Figure 5:
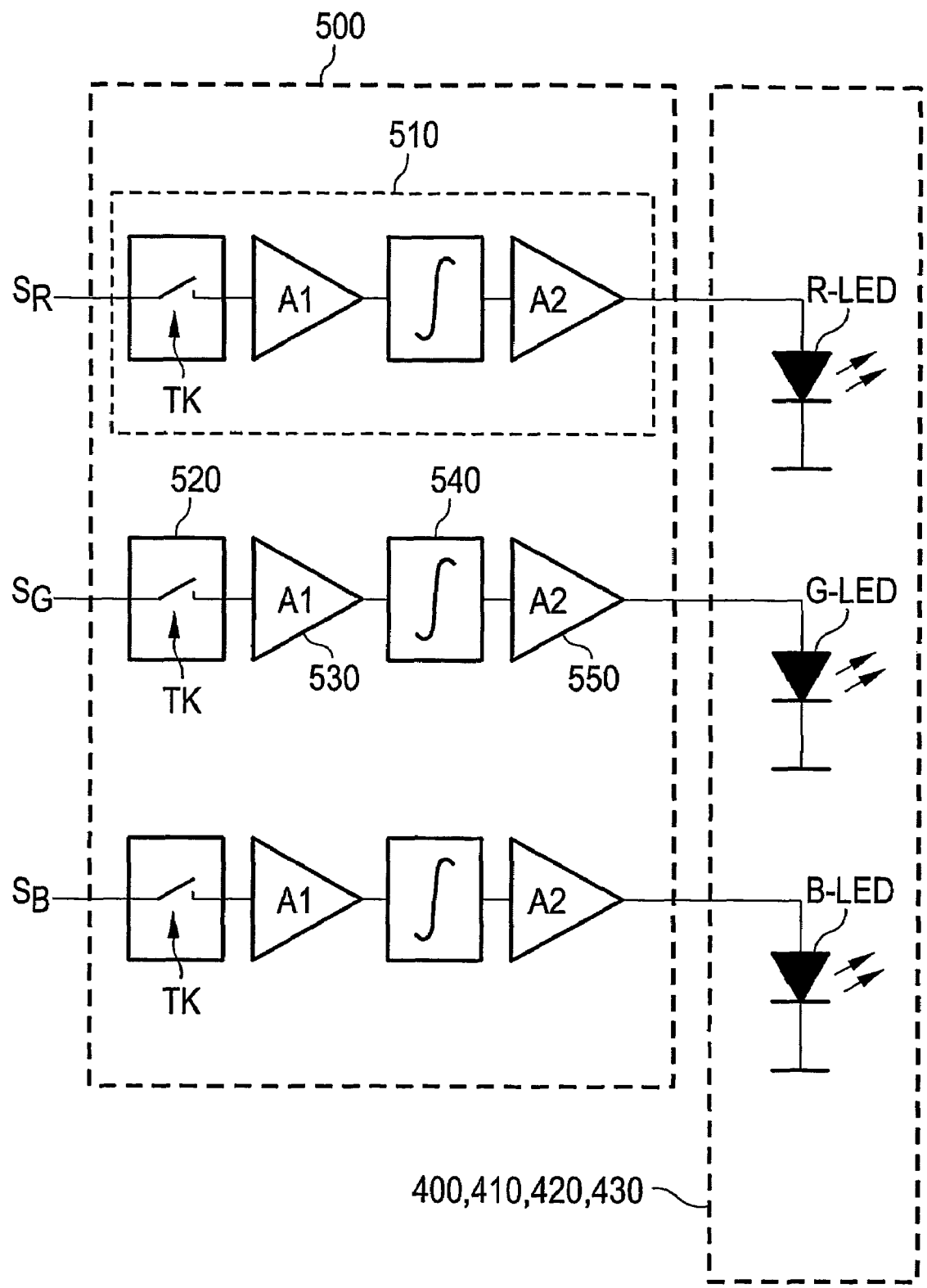

Drive circuits for energizing the groups of illumination sources 400, 410, 420, 430 will now be described with reference to FIG. 5.

Each of the groups of illumination sources 400, 410, 420, 430 includes sources of red light, blue light and green light, namely "R-LED", "B-LED" and "G-LED" respectively. By energizing the sources to relatively different degrees, it is feasible to cause the sources of light collectively to generate light radiation having a controllable color from black through to white, with intermediate colors such as orange, red, yellow, brown, blue, green, mauve and cyan therebetween. In FIG. 5, a drive circuit associated with each of the group of illumination sources is denoted by 500. The drive circuit 500 includes a control channel for each primary color, namely red, green and blue as illustrated; for example, there is a control channel 510 for the source of red light, namely R-LED. Each channel comprises in series (as illustrated for the control channel for the source of green light).

(a) a sampling switch 520, gated by a timing signal TK, for receiving a color signal, for example, a signal SG indicative of green color intensity within an associated monitoring region of the display region 50;

(b) a signal conditioning amplifier (A1) 530 for receiving an output from the switch 520 and generating a corresponding buffered signal;

(c) a temporal integrator 540 for integrating the buffered signal from the amplifier 530 and generating a corresponding integrated signal; and (d) an output power amplifier (A2) 550 for receiving the integrated signal from the integrator 540 and generating a corresponding energizing signal for driving the source of green radiation, namely the G-LED.

It will be appreciated that the channel 510 is susceptible to being implemented in several alternative ways. For example, the output power amplifier 550 is susceptible to being implemented as a linear amplifier and/or as a switch mode amplifier, for example utilizing pulse width modulation (PWM) power control to reduce thermal dissipation arising within the control circuit 500. Moreover, the integrator 540 is preferably implemented in a manner akin to a low-pass filter. If required one or more of the channels 510 of the circuit 500 can be implemented substantially digitally in a microcontroller coupled to output drive amplifiers for controllably energizing the sources of illumination.

In operation, the circuit 500 is arranged so that light radiation emitted from lateral panels 100a, 100b temporally lags corresponding image details presented on the display region 50. Such temporal lag, for example generated by the switch 520 operating in conjunction with the integrator 540, is of benefit in reducing viewer visual eyestrain fatigue as well as enabling the supplementary illumination system comprising the panels 100a, 100b to visually blend better with the display region 50 when presenting typical contemporary program material. If required, the timing signal TK can be generated from the monitor 40 itself, thereby enabling the lateral panels 100a, 100b to change their colors rapidly when a change of scene occurs, for example when the display region 50 changes from presenting a sunny yellow beach with blue sky to a dark winter scene, and yet changing only gradually when a given scene is presented to the viewer on the display region. In other word, the channels 510 of circuit 500 are susceptible to having dynamically variable temporal response characteristics.

The upper and lower panels 110, 120 can be arranged to function in a similar manner to the lateral panels 100a, 100b as described in the foregoing. Optionally, the upper and lower panels 110, 120 are included and operate in similar manner to the lateral panels 100a, 100b. Optionally, the upper and lower panels 110, 120 are susceptible to being viewer-selectable so that the viewer can select to disable one or more of the upper and lower panels 110, 120 when it is desirable to concentrate on using substantially only the lateral panels 100a, 100b.

Referring to FIG. 1 to FIG. 5, embodiments of the supplementary visual display system according to the invention have been described which include monitoring means monitoring intensity and/or color of the image display region 50 and generating corresponding image indicative signals, wherein controlling means 500 control light irradiated by illumination sources 100a, 100b, 110, 120 in response to the image indicative signals. All these embodiments can of course be realized using 2D display devices displaying two-dimensional images or alternatively using 3D display devices displaying three-dimensional images.

It is emphasized that all embodiments discussed above can be realized to additionally or alternatively provide monitoring means monitoring depth information of an image displayed in the image display region 50 and generating corresponding image indicative signals (or more precisely depth information indicative signals), wherein controlling means 500 control light irradiated by illumination sources 100a, 100b, 110, 120 in response to the image indicative signals (or depth information indicative signals).

For this purpose, depth information is derived from two-dimensional images or three-dimensional images displayed on a display devices. Such depth information is used to create signals supplied to the controlling means to control the illumination device such that the ambient lighting is correlated with the estimated depth information. In other words, the three-dimensional contribution of image data related to video content to be played back controls the way the light is emitted by the illumination sources.

In the following, referring to FIG. 6, a supplementary visual display system 600 according to an embodiment of the invention will be described.

Figure 6:
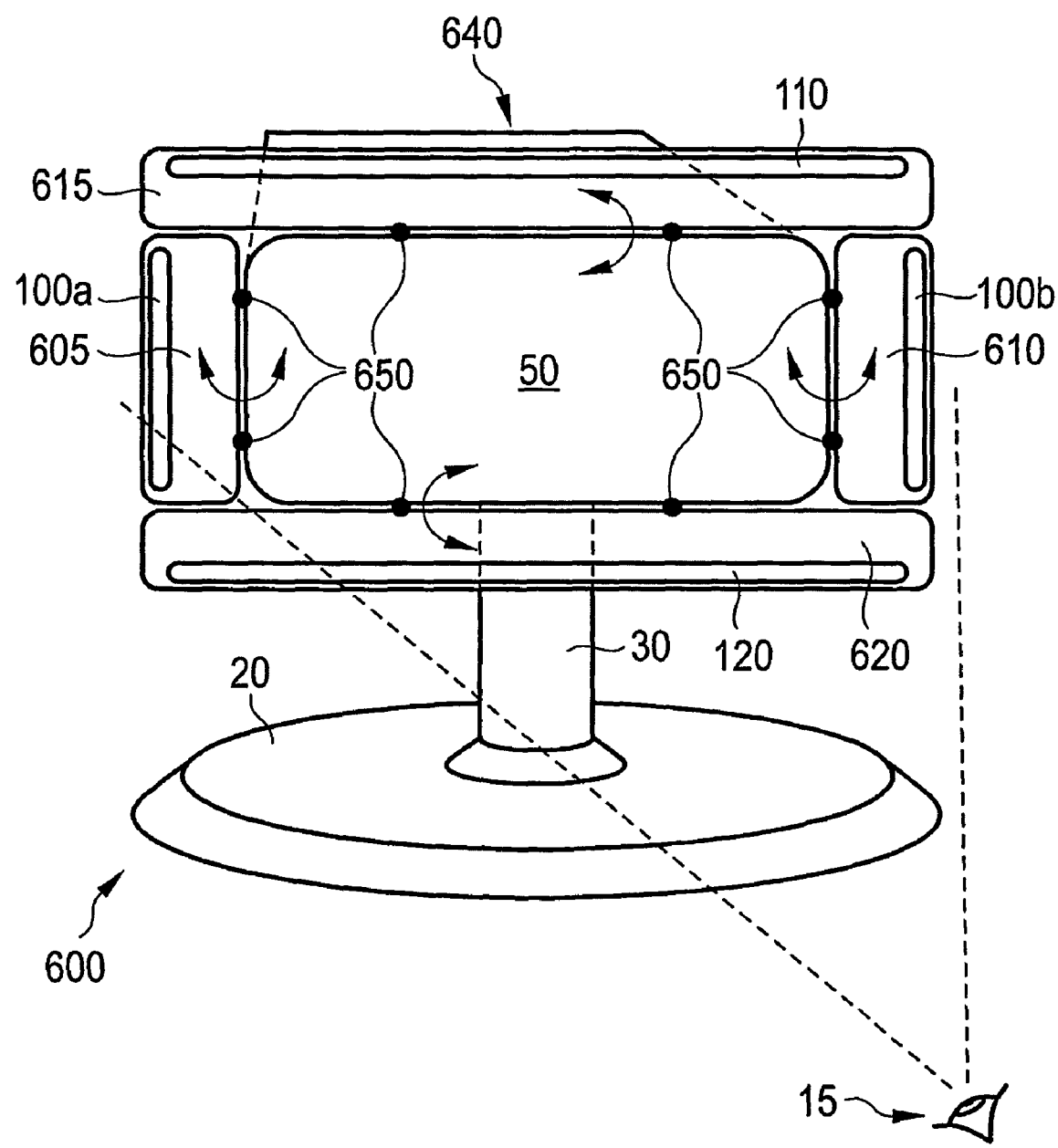
FIG. 6 is a schematic diagram of a supplementary visual display system having implemented a display device adapted for displaying a three-dimensional image and controlling illumination sources arranged on pivotable plates under consideration of depth information.

The supplementary visual display system 600 differs from the supplementary visual display system 10 shown in FIG. 1 in that the supplementary visual display system 600 has a display device 640 adapted for displaying a three-dimensional image (alternatively, the embodiment of FIG. 6 may also be realized with a display device adapted for displaying a two-dimensional image). Further, the supplementary visual display system 600 comprises pivotable plates 605, 610, 615, 620, wherein illumination sources 100a, 100b, 110, 120 are attached to the pivotable plates 605, 610, 615, 620. Each of the pivotable plates 605, 610, 615, 620 is connected via hinges 650 to a respective side of the image display region 50.

In case that 3D video content is played back on the 3D display device 640, depth information included in 3D image data encoding the video content is derived directly from the 3D image data. Monitoring means continuously monitor such depth information and generate corresponding image indicative signals. These signals are transmitted-to-controlling means to control the illumination sources 100a, 100b, 110, 120 (realized, according to the described embodiment, as bars of light-emitting diodes) and to control the tilt angle and the pivoting of each of the pivotable plates 605, 610, 615, 620 with respect to the image display region 50. The controlling means perform this controlling such that the light generated in the environment of the image display region 50 by the illumination sources 100a, 100b, 110, 120 is correlated with the estimated depth information. By tilting each of the pivotable plates 605, 610, 615, 620 individually using the hinges 650, and by steering the on and off times, the color and the intensity of light emitted by the illumination sources 100a, 100b, 110, 120, the 3D video content is mapped to light. Tilting of the pivotable plates 605, 610, 615, 620 allows to selectively adjust a distance of each side of the image display region 50 to the respective illumination source 100a, 100b, 110, 120.

According to a modified embodiment not shown in the figures, determined depth information may be sent to an electrical rotatable mirror. This mirror rotates one or more light beams emitted by illumination sources such that the position at which the light will be projected depends on the depth of the video image.

By using an arrangement having a mechanically movable component (like one or more pivotable plates or one or more rotatable mirrors), a small number of illumination sources is sufficient. For instance, a single bar or column of light sources like LEDs can be used.

The embodiment having implemented a rotating mirror can be compared with a flash light: when being pointed on a wall next to the TV, a corresponding part is illuminated. When slightly changing the orientation of the flash light, the light spot moves either to the right or to the left. In case that a plurality (instead of a single) flashlight or light emitting element is provided, than the whole illuminated area can be changed in position depending on the depth information.

In the following, referring to FIG. 7A, a supplementary visual display system 700 according to an embodiment of the invention will be described.

Figure 7A:
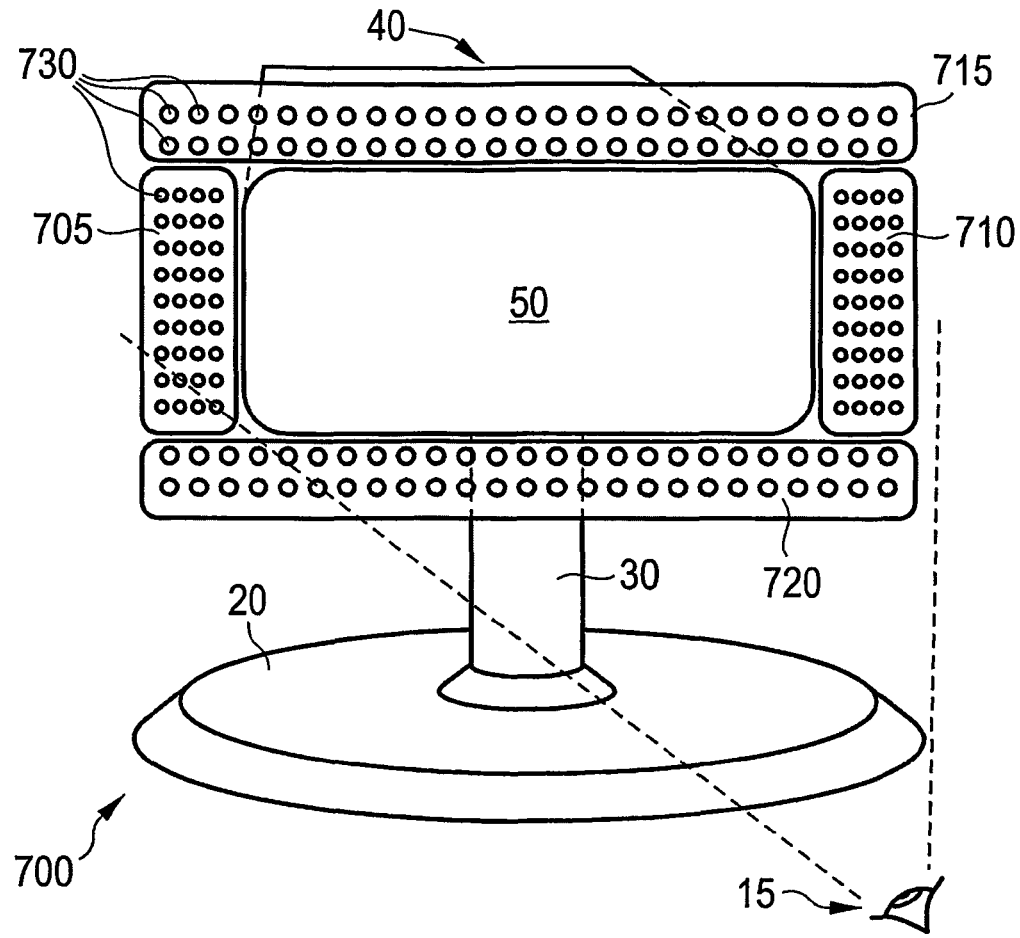
FIG. 7A is a schematic diagram of a supplementary visual display system having implemented a display device adapted for displaying a two-dimensional image and controlling a matrix of illumination sources arranged on fixed plates under consideration of depth information.

FIG. 7A illustrates the supplementary visual display system 700 having implemented a display device 40 adapted for displaying a two-dimensional image (alternatively, the embodiment of FIG. 7A may also be realized with a display device adapted for displaying a three-dimensional image). The supplementary visual display system 700 differs from the supplementary visual display system 10 shown in FIG. 1 in that the supplementary visual display system 700 comprises fixed plates 705, 710, 715, 720, wherein a matrix of light emitting diodes 730 as illumination sources are provided at each of the spatially fixed and immovable plates 705, 710, 715, 720. Each of the plates 705, 710, 715, 720 is connected to a respective side of the image display region 50. Each matrix of light emitting diodes 730 arranged on the fixed plates 705, 710, 715, 720 is controlled under consideration of previously estimated depth information.

Figure 7B:
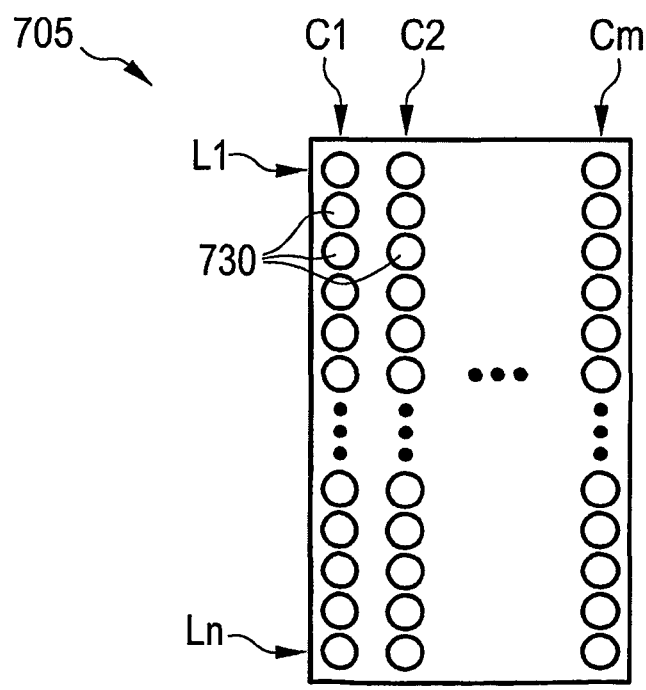
FIG. 7B is a detailed schematic diagram showing the matrix of illumination sources arranged on fixed plates of the supplementary visual display system illustrated in FIG. 7A.

FIG. 7B illustrates a detailed schematic diagram showing the matrix of light emitting diodes 730 arranged on the fixed plate 705 of the supplementary visual display system 700. In this matrix, the light emitting diodes 730 are arranged in rows L1, . . . , Ln and in columns C1, . . . , Cm.

Since 2D video content is played back on the 2D display device 40, depth information is extracted from the 2D image data. Monitoring means continuously monitor such depth information and generate corresponding image indicative signals. These signals are transmitted to controlling means to control the light-emitting diodes 730. The controlling means perform this controlling such that the light generated in the environment of the image display region 50 by the light-emitting diodes 730 is correlated with the estimated depth information. By adjusting the on and off times, the color and the intensity of light emitted by the light-emitting diodes 730, the depth information contained in the 2D video content is mapped to light.

In the embodiment shown in FIG. 7A and FIG. 7B, movable parts are dispensable. Multiple light sources, namely the light-emitting diodes 730, are used. The array column selection (1 to m) is performed in correspondence with an output of a depth information estimation unit. The light-emitting diodes 730 of each array are controlled such that activated light-emitting diodes 730 illuminate an ambient of the image display region 50 in a characteristic dependence of determined depth information.

At either side of the TV set 700, a number of columns of linearly arranged light-emitting diodes 730 is provided. Each element or light-emitting diode 730 may act as a multi color light source, for instance an RGB-LED. The array is arranged such that each column positions a different illuminated part on the wall.

It will be appreciated that embodiments of the invention described in the foregoing are susceptible to being modified without departing from the scope of the invention as defined by the appended claims.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A visual display system including a display device having an image display region on a screen, said system displaying in said image display region images represented by received image data, the system comprising:
(a) at least one illumination source disposed relative to the display device for illuminating a respective area that appears to a viewer as being adjacent to a peripheral portion of the image display region; and
(b) a control device for, in dependence on a depth signal derived from the received image data, controlling movement of light radiation emitted from the at least one illumination source, where said depth signal represents a movement component of a displayed object in a direction substantially perpendicular to the screen.

2. A visual display system according to claim 1 where the at least one illumination source comprises a plurality of light emitting elements arranged adjacent to but at different distances from said peripheral portion of the image display region, said control device sequentially energizing different ones of said light emitting elements in response to said depth signal to effect said movement of light radiation.

3. A visual display system according to claim 1 where the at least one illumination source comprises a movable array of light emitting elements disposed adjacent to said peripheral portion of the image display region, said control device moving said array relative to said peripheral portion in response to said depth signal to effect said movement of light radiation.

4. A visual display system according to claim 1 where the control device is adapted to temporally delay energization of at least one of the illumination sources in response to program content presented on the image display region.

5. A visual display system according to claim 4 where the control device is adapted to dynamically vary the temporal delay as a function of program content presented on the image display region.

6. A visual display system according to claim 1 where the at least one illumination source is selectively user-deactivated.

7. A visual display system according to claim 1 where the at least one illumination source includes illumination sources disposed laterally, above and below the image display region when the screen is disposed in a substantially upright orientation.

8. A visual display system according to claim 7 where at least one of the illumination sources includes a plurality of groups of light emitting elements and light diffusing means spatially interposed between said groups.

9. A visual display system according to claim 7 where the display device comprises a wide-screen television set including first and second ones of said illumination sources disposed adjacent laterally opposite sides of the image display region.

10. A visual display system according to claim 1 where the at least one illumination source is in the form of an integral component that can be added to the display device.

11. A visual display system according to claim 1 where the display device comprises a television set.

12. A visual display system according to claim 1 including a control device for energizing at least one illumination source in response to ambient conditions pertaining to the display device and in response to program content presented on the image display region.

13. A visual display system according to claim 12 where the at least one illumination source includes first light emitting elements disposed adjacent to the image display region and second light emitting elements disposed more remotely from the image display region, said control device controlling the first light emitting elements to emit light radiation providing at least a partial extension of program content presented on the image display region and controlling the second light emitting elements to emit light radiation blending in with the ambient conditions.

14. A visual display system according to claim 1 where the display device is adapted to display two-dimensional images.

15. A visual display system according to claim 14 where the depth information is derived from two-dimensional image data related to two-dimensional images to be presented on the display device.

16. A visual display system according to claim 1 where the display device is adapted to display three-dimensional images.

17. A visual display system according to claim 16 where the depth information is derived from three-dimensional image data related to three-dimensional images to be presented on the display device.

18. A visual display system according to claim 17 where the depth information is derived from meta data forming a part of three-dimensional image data related to three-dimensional images to be presented on the display device.

19. A visual display system according to claim 1 where the location where the at least one illumination source emits light radiation is correlated with a location of at least one object displayed on the image display region.

20. A visual display system according to claim 1 where at least one of the color and the brightness of the light radiation emitted by the at least one illumination source is correlated with a location of said displayed object.

21. A visual display system according to claim 1 where the light radiation emitted from the at least one illumination source is moved in correlation with a location of said displayed object.

22. A visual display system according to claim 1 where the at least one illumination source comprises a plurality of light emitting elements, said control device sequentially energizing different ones of said light emitting elements in a predetermined order to mimic a motion in correlation with a location of said displayed object.

23. A visual display system according to claim 22 where the plurality of light emitting elements are arranged in a matrix array having rows (L1, . . . , Ln) and columns (C1, . . . , Cm).

24. A visual display system according to claim 1 where the at least one illumination source is disposed on a carrier substrate.

25. A visual display system according to claim 24 where the carrier substrate is pivotally attached to the display device.

26. A method of operating a visual display system including a display device having an image display region on a screen, said system displaying in said image display region images represented by received image data, the method including the steps of:
(a) providing at least one illumination source disposed relative to the display device for illuminating a respective area that appears to a viewer as being adjacent to a peripheral portion of the image display region; and
(b) providing a control device for, in dependence on a depth signal derived from the received image data, controlling movement of light radiation emitted from the at least one illumination source, said depth data representing a movement component of a displayed object in a direction substantially perpendicular to the screen.

* * * * *